Figure 3:
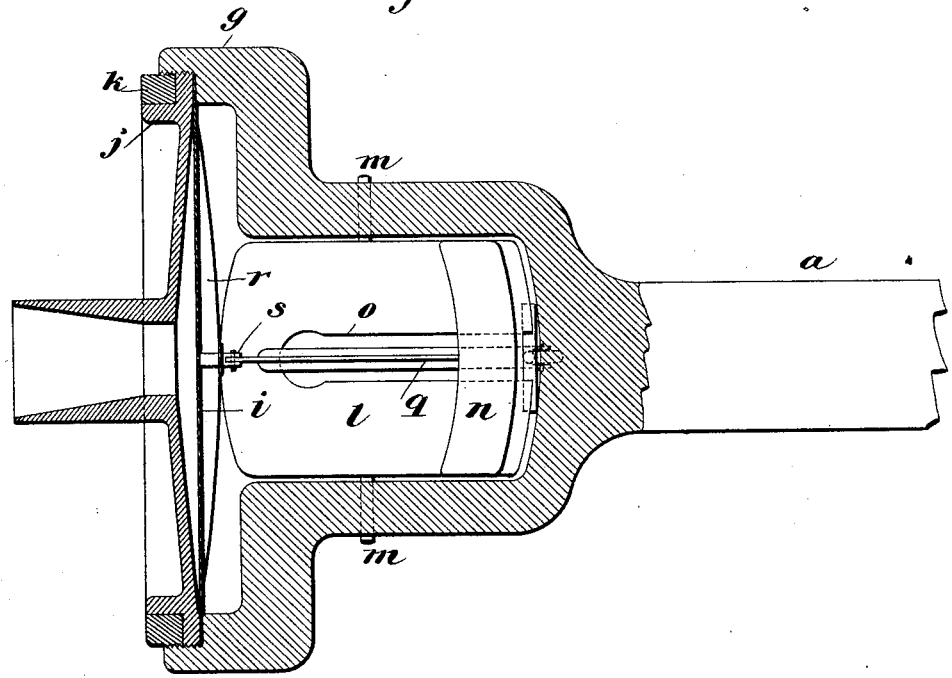

No. 703,774. Patented July 1, 1902.
T. A. EDISON.
REPRODUCER FOR PHONOGRAPHS.
(Application filed Mar. 24, 1898.)
(No Model.) 3 Sheets—Sheet 1.
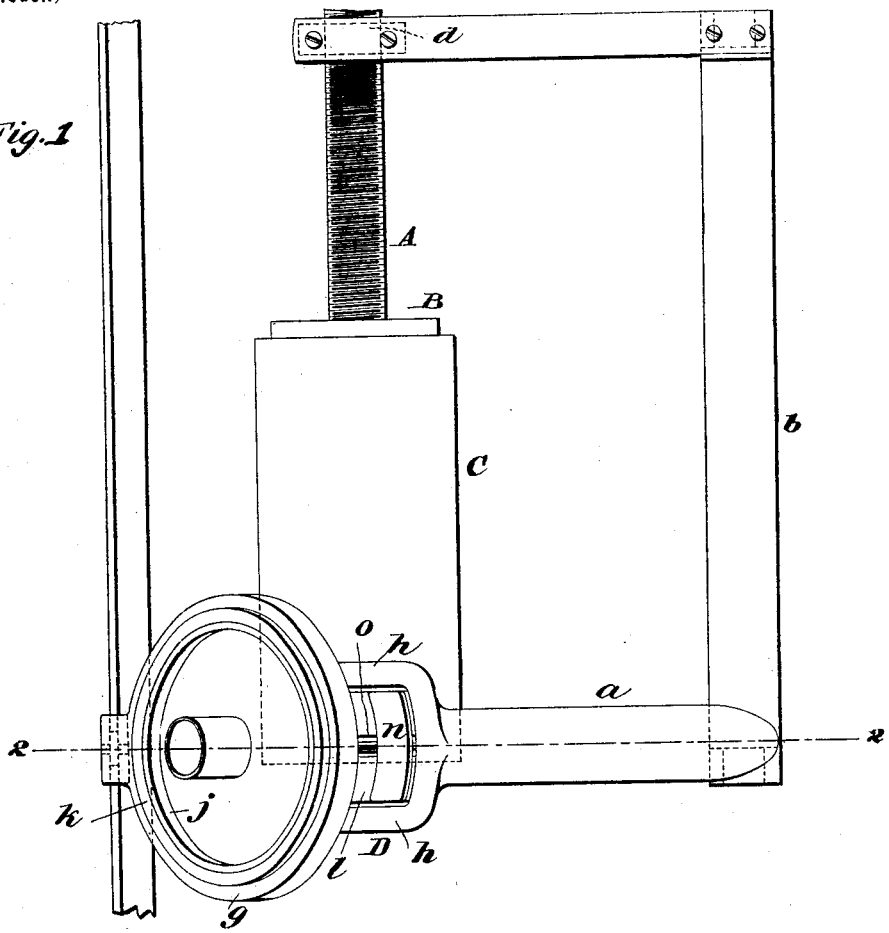
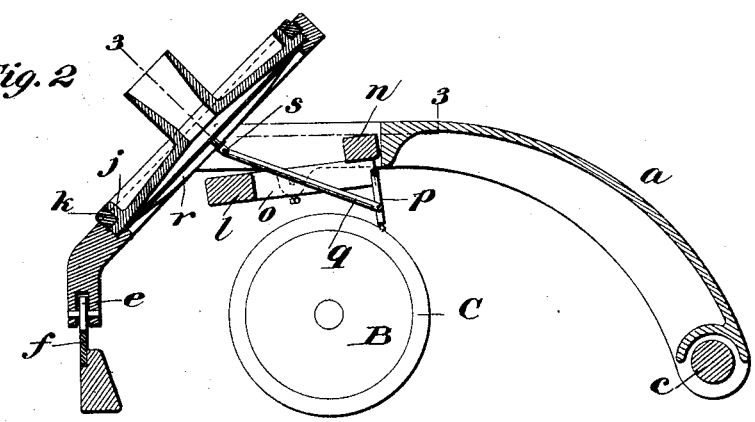
Witnesses:
Jas. F. Coleman
Frank L. Dyer
Inventor
Thomas A. Edison,
By Rich'd N. Dyer,
Atty.

No. 703,774. Patented July 1, 1902.
T. A. EDISON.
REPRODUCER FOR PHONOGRAPHS.
(Application filed Mar. 24, 1898.)

(No Model.) 3 Sheets—Sheet 2.

No. 703,774. Patented July 1, 1902.
T. A. EDISON.
REPRODUCER FOR PHONOGRAPHS.
(Application filed Mar. 24, 1898.)
(No Model.) 3 Sheets—Sheet 3.
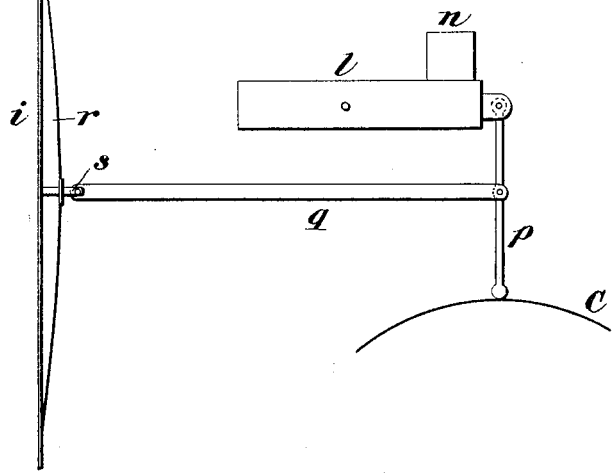
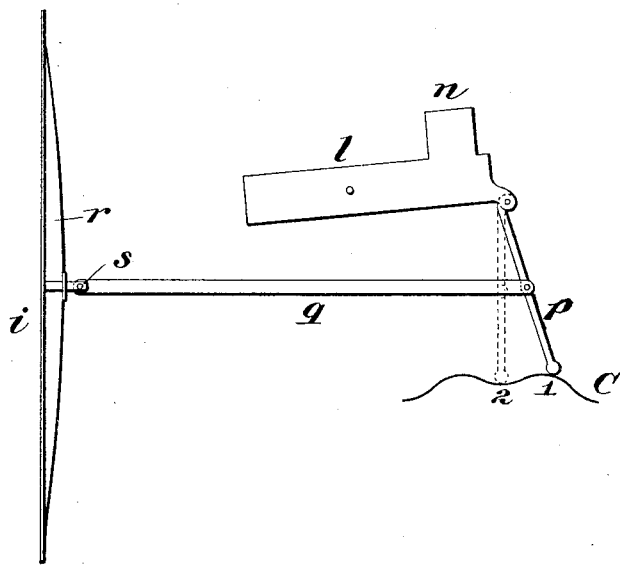

UNITED STATES PATENT OFFICE.

THOMAS A. EDISON, OF LLEWELLYN PARK, NEW JERSEY.

REPRODUCER FOR PHONOGRAPHS.

SPECIFICATION forming part of Letters Patent No. 703,774, dated July 1, 1902.

Application filed March 24, 1898. Serial No. 675,000. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Reproducers for Phonographs, of which the following is a specification.

My invention relates to improvements in reproducers for phonographs and other talking-machines.

The object I have in view is to provide a sound-reproducer for the purpose by which the record on the blank will be closely and accurately followed by the reproducer-point, so as to result in the better reproduction of the original sounds, and wherein false vibrations will be eliminated to a large extent.

In carrying out my invention I so support and arrange the reproducing arm or lever relatively to the blank that the friction between the reproducer ball or point and the blank may be utilized in effecting vibration of the diaphragm. The friction with the record, therefore, instead of being a source of objection is by my invention effectively utilized in the reproduction. This friction may alone be relied upon to effect vibration; but I prefer to construct the device in such a way that the vibration of the reproducer ball or point will be directly communicated to and assist in the vibration of the diaphragm.

A further important feature of my invention relates to the construction and mounting of the diaphragm, whereby slight false vibrations are largely eliminated and the true vibrations largely amplified.

In the production of what I consider to be the best form of my invention I provide a reproducer arm or lever arranged at an angle to the diameter of the blank, so that it will trail easily and smoothly upon its surface, said reproducing-lever being pivoted at its upper end to a slightly-overbalanced weight, by which the reproducer-point will be kept always in contact with the blank, but will be free to accommodate itself to irregularities and eccentricities therein, said weight possessing sufficient inertia to be uninfluenced by the vibrations of the reproducing-point, and I connect said reproducing arm or lever with the diaphragm by a single link, which may work within a slot in the weight, said diaphragm being provided, preferably on its under side, with a series of radial stiffening-ribs gradually decreasing in thickness from their point of intersection at the center of the diaphragm, and the plate or disk to which the diaphragm is secured being arranged very closely to the diaphragm, so that the said disk and diaphragm will constitute a dash-pot, whereby a retarded movement of the diaphragm will be obtained. The advantages of these special constructions and their coöperation in the carrying out of my object to obtain a more perfect reproducer will be hereinafter explained.

In order that my invention may be understood, attention is directed to the accompanying drawings, forming part of this specification, and in which—

Figure 4:
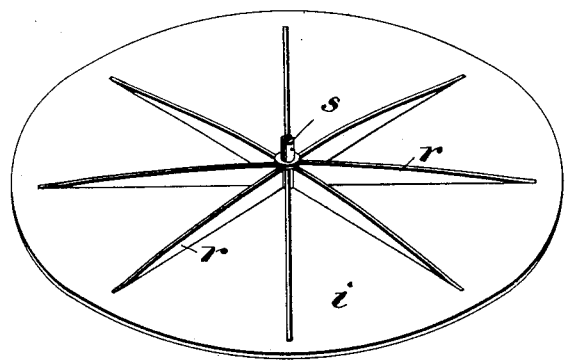

Figure 1 is a plan view of parts of a well-known form of phonograph, showing the preferred form of my present invention applied thereto. Fig. 2 is a section through the same on the line 2 2; Fig. 3, a section on the line 3 3 of Fig. 2; Fig. 4, a perspective view of the preferred form of diaphragm; Fig. 5, a diagrammatic view illustrating a modification of my invention wherein friction alone is relied upon to effect the vibrations of the diaphragm, and Fig. 6 a diagrammatic view illustrating the operation of the preferable form of my invention.

In all of the above views corresponding parts are represented by the same characters of reference.

A represents the feed-shaft of an ordinary phonograph, and B the blank mandrel thereof.

C represents the phonogram-blank carried on said mandrel.

D represents the main operative parts of the improved reproducer, carried on an arm $a$, connected to a sleeve $b$, the latter working on a stationary rod $c$ at the back of the instrument. The reproducer is fed longitudinally of the blank B by a nut $d$, coöperating with the feed-screw A. The arm $a$ is supported at its forward end by an antifriction-roller $e$, working on a track $f$. The reproducer in this instance comprises a flanged annular ring $g$, carried by the bifurcated arms $h\ h$ of the arm $a$. The diaphragm $i$ is supported on the flange of the ring $g$, and above said diaphragm is the plate $j$, held in place by a clamping-ring $k$. The plate $j$ is provided with a hollow nipple, to which the listening tubes or horn are or is attached. Mounted upon the arms $h\ h$ is a weight $l$, carried on horizontal pivots $m$ and overbalanced at its rear end either by placing the pivots $m$ forward of the center of gravity or by employing an auxiliary weight $n$, cast integral therewith, as shown. The weight $l$ is formed with a slot $o$ therein. The reproducer arm or lever $p$ is pivoted at its upper end to the weight $l$, and its lower end is formed in a small ball, jewel, or other suitable surface for cooperation with the record. The reproducer arm or lever $p$ will be maintained in contact with the record by reason of its connection with the weight $l$, which possesses sufficient inertia to be uninfluenced by the vibrations of the record, but which at the same time will be affected by any inequalities or eccentricities of the blank. The reproducer arm or lever $p$ is shown as extending at an angle to the diameter of the blank B, so that it will trail smoothly and easily thereon without chattering. The said reproducer arm or lever is connected to the diaphragm $i$ at its central part by a link $q$, passing through the slot $o$ in the weight. By employing a weighted retarding device, as explained, in connection with a reproducer arm or lever, arranged at an angle with respect to the diameter of the blank, the effect of the weight is to move or slide the reproducer-point relatively to the blank, tending to increase the angle of inclination and producing a normal strain or tension upon the diaphragm, so that any vibrations of the point will be communicated to the diaphragm without lost motion and the elasticity of the diaphragm will maintain the reproducing-point always in contact with the record. When it is desired to give to the diaphragm $i$ a retarded movement to reduce false vibrations, as will be explained, the plate or disk $j$ is arranged in such proximity to the diaphragm that the film of air between the two will in being rapidly compressed and expanded under the vibrations of the diaphragm effect the necessary retardation thereof. In order, however, to increase this effect and at the same time to produce increased effect of the true vibrations, the diaphragm is preferably stiffened, so that it will move bodily under the effect of the vibrations, and in Fig. 4 I illustrate the preferred way of effecting this result. In this figure the diaphragm $i$ is shown as being provided on its under side with a series of radial ribs $r$, converging at the center and impinging against a pivot $s$, to which the link $q$ is secured. These radial ribs $r$ are secured to the diaphragm in any suitable way, and they are preferably of a gradually-decreasing thickness from the center toward the periphery. The said ribs may be made of wood, metal, or other material.

In operation the overbalanced weight $l$ will, as stated, cause the reproducer-point to be always maintained in engagement with the record, irrespective of imperfections and eccentricities therein. The blank B in revolving beneath the point will cause an additional outward stress on the diaphragm other than that produced by the effect of the weight, an action which, so far as I am aware, has never before been secured in this art. When an undulation occurs on the blank, the friction on the reproducer point or ball is nearly obliterated, because the inertia of the weight is such that it cannot cause the depression of the lever $p$ and reproducer-point with sufficient rapidity to follow the record. Hence this is effected by the elasticity of the diaphragm, which, as stated, is under the tension of the weight and of the friction with the blank. This reproducer point or ball having been forced by the elasticity of the diaphragm to the bottom of the indentation, the riding up against the incline of the indentation by the reproducer point or ball produces a great increase of friction, (in excess of the normal friction which would result from the engagement of the reproducer with a smooth blank,) and this causes the diaphragm to be again placed under tension. When the lever $p$ is not oblique, as in Fig. 5, the only motion which the diaphragm can receive must be due entirely to the action of friction between the reproducer and the record, since no vertical motion of the reproducer will give any appreciable movement to the diaphragm. I consider it preferable, however, to supplement the friction due to the rise and fall of the producer on the blank by the variations in the blank being communicated directly to the diaphragm, as is possible with an inclined reproducer, as described. This action is clearly illustrated in Fig. 6. The lever $p$ being pivoted to the weight swings on practically a fixed pivot due to the inertia of the weight. From the top 1 of the undulation to the bottom 2 thereof the lever is moved by the elasticity of the diaphragm, while in being moved back to its original position the friction is sufficient to again place the diaphragm under tension, the effect of the weight on the inclined lever $p$ producing a much greater stress on the diaphragm than would be produced by friction alone, as in Fig. 5. With the form shown in Fig. 6, therefore, the vibrations of the diaphragm will be very powerful, and at the same time the original sound-waves will be faithfully and accurately reproduced.

The improved diaphragm is made, preferably, of very thin mica, and the radial ribs extend very close to the edge. The radial arms are proportioned in number to the thickness of the diaphragm, so that the areas between said arms may not vibrate independently. When properly proportioned, almost all of the elasticity will be obtained in the edge portion of the diaphragm, and the motions produced by the record cause nearly the whole surface of the diaphragm to move with the same amplitude and not at the central portion only, as is now the case. Such a diaphragm will therefore result in very powerful reproduction.

In order to reduce false vibrations, the amplitude of which is very slight, I arrange the diaphragm, as stated, adjacent to the plate or disk $j$, so that a retarded movement of the diaphragm will be secured by causing the diaphragm itself to act as the piston element of the dash-pot, the other element of the dash-pot being the said disk or plate. It will thus be seen that the thin film of air which exists between these two elements will be rapidly compressed under the vibrations of the diaphragm, acting to retard the same and eliminating the small false vibrations, though not affecting the true vibrations. This retardation of the diaphragm is enhanced if the diaphragm moves bodily, as stated, rather than simply buckling at its central part, as is now the case.

Having now described my invention, what I claim as new, and desire to secure by Letters Patent, is as follows:

1. In a phonograph, the combination with a phonograph-record, of a reproducing-lever carrying a reproducing device coöperating with said record, a weighted retarding device connected with said lever at its end, a diaphragm, and a link connecting said diaphragm with said lever between the reproducing device and said weight, whereby the friction between the reproducing device and the rotating record will impose stress on the diaphragm, substantially as and for the purposes set forth.

2. In a phonograph, the combination with a phonograph-record, of a reproducing-lever carrying a reproducing device which coöperates with the record, said lever being arranged at an angle to the diameter of the record, a weighted retarding device connected to said lever at its end, a diaphragm, and a link connecting said diaphragm with the reproducing-lever between the reproducing device and said weight, whereby the effect of the weight tends to increase the inclination of said lever to impose tension on the diaphragm, substantially as and for the purposes set forth.

3. In a phonograph, the combination with a phonograph-record, of a reproducing-lever carrying a reproducing device coöperating with said record, a pivoted retarding-weight to which the lever is pivoted at its end, a diaphragm, and a link connecting the diaphragm with said lever between the reproducing device and said weight, substantially as and for the purposes set forth.

4. In a phonograph, the combination with a phonograph-record, of a reproducing-lever carrying a reproducing device coöperating with said record, a pivoted retarding-weight to which the lever is pivoted at its end, a diaphragm, and a link connecting the diaphragm with said lever between the reproducing device and said weight, said link passing through a slot in the weight, substantially as and for the purposes set forth.

5. In a phonograph, the combination with the record, of a reproducing-point, a diaphragm connected to the reproducing-point, a stationary casing with respect to which said diaphragm vibrates, the diaphragm being located sufficiently close to the casing as to allow for a thin film of air between the two, whereby the vibrations of the diaphragm will be retarded, and radial ribs secured to said diaphragm for stiffening said diaphragm so as to produce bodily movements thereof, substantially as set forth.

6. In a phonograph, the combination with the record, of a reproducing-point, a diaphragm connected to the reproducing-point, a stationary casing with respect to which said diaphragm vibrates, the diaphragm being located sufficiently close to the casing as to allow for a thin film of air between the two, whereby the vibrations of the diaphragm will be retarded, and radial ribs of gradually-decreasing thickness secured to said diaphragm for stiffening said diaphragm so as to produce bodily movements thereof, substantially as set forth.

7. An improved diaphragm for phonographs comprising a plate, and radial ribs secured to the same on one side thereof, substantially as set forth.

8. An improved diaphragm comprising a plate, and radial ribs of gradually-decreasing thickness secured to the same on one side thereof, substantially as set forth.

This specification signed and witnessed this 21st day of March, 1898.

THOMAS A. EDISON.

Witnesses:
 S. O. EDMONDS,
 J. F. RANDOLPH.